(12) United States Patent
Chae et al.

(10) Patent No.: US 10,955,564 B2
(45) Date of Patent: Mar. 23, 2021

(54) DRYING APPARATUS FOR DRYING CANISTER FOR SPENT NUCLEAR FUEL TRANSPORTATION AND STORAGE, CONTROL METHOD THEREFOR, AND RADIATION SHIELDING GEOMETRY FOR RADIATION DOSE RATE DETECTOR THEREFOR

(71) Applicant: SAE-AN ENGINEERING CORPORATION, Seoul (KR)

(72) Inventors: Gyung Sun Chae, Gyeonggi-do (KR); Byeong Mok Park, Gwangju (KR); Kyoung Uk Shin, Gwangju (KR); Jae Hyun Han, Gyeongsangbuk-do (KR); Hyeong Seop Jeon, Daejeon (KR); Ki Sung Son, Daejeon (KR); Do Yeong Jung, Seoul (KR); Jae Seok Park, Seoul (KR)

(73) Assignee: SAE-AN ENGINEERING CORPORATION, Seoul (KR)

( * ) Notice: Subject to any disclaimer, the term of this patent is extended or adjusted under 35 U.S.C. 154(b) by 43 days.

(21) Appl. No.: 16/476,055

(22) PCT Filed: Jan. 12, 2018

(86) PCT No.: PCT/KR2018/000582
§ 371 (c)(1),
(2) Date: Jul. 3, 2019

(87) PCT Pub. No.: WO2018/135809
PCT Pub. Date: Jul. 26, 2018

(65) Prior Publication Data
US 2019/0353801 A1 Nov. 21, 2019

(30) Foreign Application Priority Data

Jan. 20, 2017 (KR) .................. 10-2017-0009959
Jan. 20, 2017 (KR) .................. 10-2017-0009960

(51) Int. Cl.
*G01T 1/02* (2006.01)
*B01D 46/00* (2006.01)
(Continued)

(52) U.S. Cl.
CPC ............ *G01T 1/02* (2013.01); *B01D 46/0004* (2013.01); *B01D 46/0005* (2013.01); *G01T 1/20* (2013.01);
(Continued)

(58) Field of Classification Search
CPC .. F26B 21/08; F26B 21/14; F26B 5/04; F26B 5/12; F26B 21/006; F26B 21/06;
(Continued)

(56) References Cited

U.S. PATENT DOCUMENTS 9,117,558 B1 * 8/2015 Pennington ............... G21F 5/10
9,165,690 B2 10/2015 Singh et al.
(Continued)

FOREIGN PATENT DOCUMENTS

JP 2003-240437 A 8/2003
JP 2003-287591 A 10/2003
(Continued)

*Primary Examiner* — Irakli Kiknadze
(74) *Attorney, Agent, or Firm* — IP Legal Services, LLC

(57) ABSTRACT

The present invention relates to a drying apparatus for drying a canister configured to transport and store spent nuclear fuels, a control method thereof, and a radiation shielding geometry for a radiation dosimeter configured to measure a radiation dose rate. An object of the present invention is to prevent a drying apparatus from being contaminated even in case of a damaged canister loaded with a spent nuclear fuel, by providing a non-contaminated circulation system and a contaminated circulation system, to easily assemble the drying apparatus to have a proper thickness depending upon a radiation dose rate, and to prevent a facility pipeline from being under stress by pro-
(Continued)

viding a radiation shielding geometry for a radiation dosimeter for measuring a radiation dose rate.

9 Claims, 8 Drawing Sheets

(51) Int. Cl.
    *G01T 1/20*     (2006.01)
    *G01T 7/02*     (2006.01)
    *G21F 5/12*     (2006.01)
    *G21F 5/14*     (2006.01)

(52) U.S. Cl.
    CPC ............... *G01T 7/02* (2013.01); *G21F 5/12* (2013.01); *G21F 5/14* (2013.01)

(58) Field of Classification Search
    CPC .......... F26B 21/10; F26B 25/007; F26B 3/06; F26B 9/06; G21C 19/32; G21F 5/005; G21F 5/008; G21F 5/06; G21F 9/28; G21F 9/34; G21F 5/12; G21F 5/125; G21F 5/14; G21F 5/10; G21F 1/08; G21F 5/00; G21F 5/015; G21F 7/005; B01D 46/0004; B01D 46/0005; G01T 1/02; G01T 1/20; G01T 7/02; Y10S 8/917; Y10S 8/918

USPC .................................................... 250/370.07
See application file for complete search history.

(56) References Cited

U.S. PATENT DOCUMENTS

| | | |
|---|---|---|
| 2003/0004390 A1 | 1/2003 | Matsunaga et al. |
| 2006/0272175 A1 | 12/2006 | Singh |
| 2008/0137794 A1* | 6/2008 | Tjersland ............... G21C 19/04 |
| | | 376/272 |
| 2010/0212182 A1 | 8/2010 | Singh |
| 2013/0163710 A1 | 6/2013 | Singh |
| 2014/0270043 A1* | 9/2014 | Lehnert .................. G21F 5/008 |
| | | 376/272 |
| 2014/0317952 A1 | 10/2014 | Singh |
| 2018/0053574 A1 | 2/2018 | Singh |

FOREIGN PATENT DOCUMENTS

| | | |
|---|---|---|
| JP | 2009-156625 A | 7/2009 |
| JP | 2011-075464 A | 4/2011 |
| KR | 10-1997-0044483 A | 7/1997 |
| KR | 10-2003-0003071 A | 1/2003 |
| KR | 10-2008-0019689 A | 3/2008 |
| KR | 10-1000883 B1 | 12/2010 |

\* cited by examiner

DRYING APPARATUS FOR DRYING CANISTER FOR SPENT NUCLEAR FUEL TRANSPORTATION AND STORAGE, CONTROL METHOD THEREFOR, AND RADIATION SHIELDING GEOMETRY FOR RADIATION DOSE RATE DETECTOR THEREFOR

CROSS REFERENCE TO RELATED APPLICATIONS

This application is a National Stage Patent Application of PCT International Patent Application No. PCT/KR2018/000582 (filed on Jan. 12, 2018) under 35 U.S.C. § 371, which claims priority to Korean Patent Application Nos. 10-2017-0009959 (filed on Jan. 20, 2017) and 10-2017-0009960 (filed on Jan. 20, 2017), the teachings of which are incorporated herein in their entireties by reference.

This work was supported by the Korea Institute of Energy Technology Evaluation and Planning (KETEP) and the Ministry of Trade, Industry and Energy (MOTIE) of the Republic of Korea under Contract project number 20181720201020.

TECHNICAL FIELD

The present invention relates to a drying apparatus for drying a canister loaded with a spent nuclear fuel to store and transport the spent nuclear fuel, a control method thereof and a radiation shielding geometry for a radiation dosimeter, specifically, to a container (referred to as a canister) loaded with a spent nuclear fuel which is positioned in a storage and transportation container (referred to as a cask) equipped with a radiation shield structure, and more specifically, to a drying apparatus for drying a canister loaded with a spent nuclear fuel and a control method thereof, wherein when starting a drying process of storing the spent nuclear fuel in a dry state, after it is determined whether the spent nuclear fuel loaded in the canister is damaged or not, based on a measured value of a radiation dose rate of a non-reactive gas initially discharged from a cavity of the canister, the non-reactive gas discharged from the canister is circulated through any one of a contaminated non-reactive gas circulation system and a non-contaminated non-reactive gas circulation system to dry the cavity of the canister, thereby preventing the drying apparatus from being contaminated by radioactive substances contained in the damaged spent nuclear fuel. Also, the present invention relates to a radiation shielding geometry for a radiation dosimeter configured to measure the radiation dose rate, wherein a measurement result is not affected from the radiation emitted from peripheral radiation sources, and the radiation dosimeter can be installed by easily adjusting a suitable shield thickness according to a level of surrounding radiation dose rate, while detecting the radiation dose rate of a target pipe, in which since the radiation shielding geometry includes the support stand, it does not put stress caused by an excessive load on the target pipe.

BACKGROUND ART

In general, storage, handling and transfer of spent nuclear fuels requires special care and procedural safeguards. A pressurized water reactor uses enriched Uranium-235 which is engaged in a fission chain reaction, which produces energy. The Uranium-235 generates various fission products, and spent nuclear fuel containing the fission products is still highly radioactive and produces considerable heat, requiring that great care be taken in its subsequent packaging, transporting and storing. Specifically, the spent nuclear fuel emits extremely dangerous neutrons and gamma photons.

The spent nuclear fuel used for nuclear power generation is stored in a spent nuclear fuel storage (referred to as a storage pool) by a wet storage method, and the water of the storage pool facilitates cooling of the spent nuclear fuel, and provides adequate radiation shielding. The spent nuclear fuel is stored in the storage pool for a period long enough to allow decay of heat and radiation to a sufficiently low level to allow the spent nuclear fuel to be transported with safety. Thus, it is standard practice in the nuclear industry to store the spent nuclear fuel in a dry state subsequent to a brief storage period in the storage pool, i.e., storing the spent nuclear fuel in a dry inert gas atmosphere encased within a structure that provides adequate radiation shielding.

The transportation and storage of the spent nuclear fuel is carried out by a spent nuclear fuel storage pool, a cask loading pit and a decontamination loading pit. More specifically, in order to transport and store the spent nuclear fuel, after an empty canister is first placed into a cavity of an open cask, the canister and the cask are disposed in cask loading pit, and the cask loading pit is filled with water. The spent nuclear fuel is removed from the spent nuclear storage pool, and then is loaded in the cavity of the canister which is in the cask located in the cask loading pit. If the loading of the spent nuclear fuel is finished, the loaded canister is fitted with a lid. After that, the cask is moved to the decontamination loading pit. The cask is transported and stored after the cavity of the canister is subjected to process of draining the water, drying the cavity, and filling the cavity with a non-inert gas.

In order for the canister loaded with the spent nuclear fuel to be properly prepared for dry storage or transportation for long periods of time, the United States Nuclear Regulatory Commission (referred to as U.S.NRC) requires that the spent nuclear fuel and interior of the canister be adequately dried before the canister is sealed and transferred to the cask. Specifically, U.S.NRC regulations mandate that vapor pressure within the canister be at or below 3 Torr (1 Torr=1 mmHg) before the canister is backfilled with an inert gas and sealed. The vapor pressure is the pressure of the vapor over a liquid at equilibrium, wherein equilibrium is defined as that condition where an equal number of molecules are transforming from the liquid phase to gas phase as there are molecules transforming from the gas phase to liquid phase. Requiring a low vapor pressure of 3 Torr or less assures an adequately dry space in the canister interior suitable for long-term spent nuclear fuel storage or transportation.

Currently, nuclear facilities comply with the 3 Torr or less vapor pressure requirement of U.S.NRC by performing a vacuum drying process. In performing this process, the bulk water that is within the canister is first drained from the canister. Once the bulk of the liquid water is drained, a vacuum system is coupled to the canister and activated so as to create a sub-atmospheric pressure condition within the canister. The sub-atmospheric condition within the canister facilitates evaporation of the remaining liquid water while the vacuum helps remove the water vapor. The vapor pressure within the canister is empirically ascertained through a vacuum-and-hold procedure. If necessary, the vacuum-and-hold procedure is repeated until the pressure rise during a prescribed test duration (30 minutes) is limited to 3 Torr. Once the vacuum drying passes the acceptance test, the canister is backfilled with an inert gas and the canister is sealed. The transfer cask (with the canister therein) is then transported to a position above a storage cask and the canister loaded with the spent nuclear fuel is transferred into the storage for long-term storage.

Current methods of satisfying the 3 Torr or less vapor pressure requirement of U.S.NRC are time consuming, manually intensive and prone to error from line and valve leakages. Any time the canister must be physically approached for vacuum monitoring and dryness testing, there is the risk of exposing the work personnel to high radiation. Moreover, the creation of sub-atmospheric conditions in the canister requires expensive vacuum equipment and can cause complicated equipment problems.

In order to solve the above problem, one technology has been proposed in Korean Patent No. 10-1000883 (filed on Jun. 6, 2006, and registered on Dec. 7, 2010), entitled "Method and apparatus for dehydrating high level waste based on dew point temperature measurements", which is assigned to Holtec International.

The configuration of the patent will now be described in brief. There is provided a method of preparing spent nuclear fuel for dry storage drying including the steps of: a) flowing a non-reactive gas through the cavity; b) repetitively measuring dew point temperature of the non-reactive gas exiting the cavity; and c) upon the dew point temperature of the non-reactive gas exiting the cavity being measured to be at or below a predetermined dew point temperature for a predetermined time, discontinuing the flow of the non-reactive gas and sealing the cavity. Also, there is provided a system for drying a cavity loaded with spent nuclear fuel including: a canister forming the cavity, the cavity having an inlet and an outlet; a source of non-reactive gas; means for flowing the non-reactive gas from the source of non-reactive gas through the cavity; and means for repetitively measuring the dew point temperature of the non-reactive gas exiting the cavity; and a controller operably coupled to the dew point temperature measuring means, wherein the dew point temperature measuring means is adapted to create signals indicative of the measured dew point temperature of the non-reactive gas and transmit the signals to the controller; and wherein the controller is adapted to analyze the signals and upon determining that the signals indicate that the measured dew point temperature is at or below a predetermined dew point temperature for a predetermined time, the controller is further adapted to (i) cease flow of the non-reactive gas through the cavity; and/or (ii) activate a means for indicating that the cavity is dry.

The above patent is configured to dry the cavity of the canister loaded with the spent nuclear fuel, but if the canister is loaded with a spent nuclear fuel already damaged or damaged during the dry process, the system cannot verify the damaged state. If the canister is subjected to the dry process, without performing the verification procedure, the dry apparatus is contaminated by the radioactive substance. If other canister is dried by the contaminated dry apparatus, the non-contaminated canister is contaminated by the radioactive substance.

In addition, when a radiation dosimeter is installed on site in order to measure a radiation dose rate of a target object, the radiation dosimeter should be housed by a radiation shielding geometry to prevent the radiation dosimeter from being influenced by radiation emitted from peripheral radiation sources, and then be installed on a pipe. The conventional radiation shielding geometry is a rectangular block made of lead, and is provided with a dosimeter installation hole at a center of one surface to install the radiation dosimeter. After the radiation dosimeter is built in the dosimeter installation hole of the radiation shielding geometry, the radiation shielding geometry is installed on a target pipe by use of a belt or an installation enclosure to measure the radiation dose rate of the target pipe. Since the radiation shielding geometry is manufactured after measuring the surrounding radiation dose rate, it is difficult to additionally shield the geometry if the surrounding radiation dose rate is changed. In some cases, the radiation shielding geometry is manufactured to have heavy weight. Therefore, there is a problem in that an excessive load is applied to the pipe, on which the radiation shielding geometry is installed, thereby exerting a bad influence on the durability of the facility.

DISCLOSURE

Technical Problem

Accordingly, the present invention has been made in view of the above-mentioned problems occurring in the related art, and an object of the present invention is to provide a dry apparatus for drying a canister loaded with a spent nuclear fuel, the dry apparatus including a non-contaminated non-reactive gas circulation system and a contaminated non-reactive gas circulation system to dry the canister, in which after a radiation dose rate is measured at an initial dry process, in case of the canister loaded with the normal spent nuclear fuel, the dry process is carried out by the non-contaminated non-reactive gas circulation system, while in case of the canister loaded with the damaged spent nuclear fuel or the spent nuclear fuel damaged in the dry process, the dry process is carried out by the contaminated non-reactive gas circulation system, thereby preventing the dry apparatus from being contaminated by the damaged spent nuclear fuel or the spent nuclear fuel damaged in the dry process.

Other object of the present invention is to provide a method for controlling a dry apparatus capable of drying a canister loaded with a spent nuclear fuel to transmit and store the spent nuclear fuel.

Another object of the present invention is to provide a radiation shielding geometry for a radiation dosimeter capable of measuring a radiation dose rate of a dry apparatus for drying a canister loaded with a spent nuclear fuel to transmit and store the spent nuclear fuel, in which the radiation shielding geometry can be easily assembled to have an appropriate thickness according to a radiation dose rate around an installation spot, can accurately measure the radiation dose rate of a target pipe, and can be conveniently installed on the pipe by a separate support stand, without being installed on the pipe, thereby applying no stress to the pipe.

Technical Solution

To accomplish the objects, according to a first aspect of the present invention, there is provided a drying apparatus for drying a cavity of a canister loaded with a spent nuclear fuel, the drying apparatus comprising: the canister having the cavity provided with a gas inlet port and a gas outlet port; a non-reactive gas source configured to store a non-reactive gas to be supplied to the cavity of the canister; a first gas circulation pump which is mounted on a first gas circulation line which connects the canister and the non-reactive gas source to communicate with each other, to feed the non-reactive gas supplied from the non-reactive gas source to the canister; a valve member which is mounted on the first gas circulation line between the first gas circulation pump and the canister to open or close the first gas circulation line; a heater which is mounted on the first gas circulation line between the valve member and the canister to heat the non-reactive gas to be supplied to the canister; a gas cooling unit which is fluidly coupled to the canister through a second gas circulation line to cool the non-reactive gas discharged from the cavity of the canister; a dew point temperature measuring member which is mounted on a third gas circulation line, which connects the gas cooling unit and the reactive gas source to communicate each other, to repeatedly measure a dew point temperature of the non-reactive gas; a second gas circulation pump which is mounted on the third gas circulation line to feed the non-reactive gas, which passes through the gas cooling unit, to the non-reactive gas source; a controller which is electrically connected to the first and second gas circulation pumps and the dew point temperature measuring member to control an operating state of the first and second gas circulation pumps and the dew point temperature measuring member; a fourth gas circulation line which is branched from the second gas, to fluidly connect the gas cooling unit and the canister, separately from the second gas circulation line, so as to transfer a contaminated non-reactive gas, which is discharged from the canister, to the gas cooling unit; a branched valve member which is mounted on a branched point, from which the second and fourth gas circulation lines are branched, to selectively open or close the second or fourth gas circulation line; a fifth gas circulation line which is fluidly coupled to the fourth gas circulation line to fluidly connect the gas cooling unit and the non-reactive gas source; a particle filter which is mounted on the fifth gas circulation line to remove particles contained in the contaminated non-reactive gas which is transferred along the fifth gas circulation line after the non-reactive gas passing the fourth gas circulation line is cooled by the gas cooling unit; a third gas circulation pump which is mounted on the fifth gas circulation line to feed the non-reactive gas, which is cooled by the gas cooling unit, to the non-reactive gas source; and a radiation dosimeter which is installed outside the second gas circulation line between the canister and the branched valve member to measure a radiation dose rate of the non-reactive gas which is discharged from the canister and is transferred along the second gas circulation line, and to send a measured signal to the controller, wherein the controller is electrically connected to the radiation dosimeter, the branched valve member, the dew point temperature measuring member, and the third gas circulation pump, respectively, to determine whether or not the non-reactive gas discharged from the canister is contaminated, according to the measured radiation dose rate received from the radiation dosimeter; if it is determined that the non-reactive gas is contaminated, the controller closes the second gas circulation line, and opens the fourth gas circulation line, so that the contaminated non-reactive gas discharged from the canister circulates along the fourth, fifth and first gas circulation lines; and if it is determined that the non-reactive gas is not contaminated, the controller closes the fourth gas circulation line, and opens the second gas circulation line, so that the non-contaminated non-reactive gas discharged from the canister circulates along the second, third and first gas circulation lines.

According to a second aspect of the present invention, there is provided, in a drying apparatus for drying a cavity of a canister loaded with a spent nuclear fuel, the drying apparatus including the canister having the cavity provided with a gas inlet port and a gas outlet port; a non-reactive gas source configured to store a non-reactive gas to be supplied to the cavity of the canister; a first gas circulation pump which is mounted on a first gas circulation line which connects the canister and the non-reactive gas source to communicate with each other, to feed the non-reactive gas supplied from the non-reactive gas source to the canister; a valve member which is mounted on the first gas circulation line between the first gas circulation pump and the canister to open or close the first gas circulation line; a heater which is mounted on the first gas circulation line between the valve member and the canister to heat the non-reactive gas to be supplied to the canister; a gas cooling unit which is fluidly coupled to the canister through a second gas circulation line to cool the non-reactive gas discharged from the cavity of the canister; a dew point temperature measuring member which is mounted on a third gas circulation line, which connects the gas cooling unit and the reactive gas source to communicate each other, to repeatedly measure a dew point temperature of the non-reactive gas; a second gas circulation pump which is mounted on the third gas circulation line to feed the non-reactive gas, which passes through the gas cooling unit, to the non-reactive gas source; a fourth gas circulation line which is branched from the second gas, to fluidly connect the gas cooling unit and the canister, separately from the second gas circulation line, so as to transfer a contaminated non-reactive gas, which is discharged from the canister, to the gas cooling unit; a branched valve member which is mounted on a branched point, from which the second and fourth gas circulation lines are branched, to selectively open or close the second or fourth gas circulation line; a fifth gas circulation line which is fluidly coupled to the fourth gas circulation line to fluidly connect the gas cooling unit and the non-reactive gas source; a particle filter which is mounted on the fifth gas circulation line to remove particles contained in the contaminated non-reactive gas which is transferred along the fifth gas circulation line after the non-reactive gas passing the fourth gas circulation line is cooled by the gas cooling unit; a third gas circulation pump which is mounted on the fifth gas circulation line to feed the non-reactive gas, which is cooled by the gas cooling unit, to the non-reactive gas source; a radiation dosimeter which is installed outside the second gas circulation line between the canister and the branched valve member to measure a radiation dose rate of the non-reactive gas which is discharged from the canister and is transferred along the second gas circulation line, and to send a measured signal to the controller; and a controller which is electrically connected to the first to third gas circulation pumps, the branched valve member, the dew point temperature measuring member, and the radiation dosimeter, respectively, to determine whether or not the non-reactive gas discharged from the canister is contaminated, according to the measured radiation dose rate received from the radiation dosimeter, and to control an operating state of the branched valve member and the first to third gas circulation pumps according to the determination result, a method for controlling the drying apparatus which dries the cavity of the canister by circulating the non-reactive gas discharged from the canister along a non-contaminated non-reactive gas circulation system or a contaminated non-reactive gas circulation system according to the contaminated or non-contaminated state of the non-reactive gas, the control method comprising: a reference radiation dose rate setting step of setting a reference radiation dose rate to determine whether the non-reactive gas is contaminated or not; a non-reactive gas feeding step of feeding the non-reactive gas to the cavity of the canister through the first gas circulation line; a radiation dose rate measuring step of measuring the radiation dose rate of the non-reactive gas transferred along the second gas circulation line at the non-reactive gas outlet port of the canister; a non-reactive gas contamination determining step of determining whether the non-reactive gas is contaminated or not, on the basis of that the radiation dose rate of the non-reactive gas measured at the radiation dose rate measuring step reaches the predetermined reference value; if it is determined at the non-reactive gas contamination determining step that the non-reactive gas is not contaminated, a non-contaminated non-reactive gas circulation step of opening the non-contaminated non-reactive gas circulation system, and closing the contaminated non-reactive gas circulation system, so that the non-contaminated non-reactive gas circulates along the non-contaminated non-reactive gas circulation system; if it is determined at the non-reactive gas contamination determining step that the non-reactive gas is contaminated, a contaminated non-reactive gas circulation step of opening the contaminated non-reactive gas circulation system, and closing the non-contaminated non-reactive gas circulation system, so that the contaminated non-reactive gas circulates along the contaminated non-reactive gas circulation system.

And, according to a third aspect of the present invention, there is provided, in a drying apparatus for drying a cavity of a canister loaded with a spent nuclear fuel, the drying apparatus including the canister having the cavity provided with a gas inlet port and a gas outlet port; a non-reactive gas source configured to store a non-reactive gas to be supplied to the cavity of the canister; a first gas circulation pump which is mounted on a first gas circulation line which connects the canister and the non-reactive gas source to communicate with each other, to feed the non-reactive gas supplied from the non-reactive gas source to the canister; a valve member which is mounted on the first gas circulation line between the first gas circulation pump and the canister to open or close the first gas circulation line; a heater which is mounted on the first gas circulation line between the valve member and the canister to heat the non-reactive gas to be supplied to the canister; a gas cooling unit which is fluidly coupled to the canister through a second gas circulation line to cool the non-reactive gas discharged from the cavity of the canister; a dew point temperature measuring member which is mounted on a third gas circulation line, which connects the gas cooling unit and the reactive gas source to communicate each other, to repeatedly measure a dew point temperature of the non-reactive gas; a second gas circulation pump which is mounted on the third gas circulation line to feed the non-reactive gas, which passes through the gas cooling unit, to the non-reactive gas source; a fourth gas circulation line which is branched from the second gas, to fluidly connect the gas cooling unit and the canister, separately from the second gas circulation line, so as to transfer a contaminated non-reactive gas, which is discharged from the canister, to the gas cooling unit; a branched valve member which is mounted on a branched point, from which the second and fourth gas circulation lines are branched, to selectively open or close the second or fourth gas circulation line; a fifth gas circulation line which is fluidly coupled to the fourth gas circulation line to fluidly connect the gas cooling unit and the non-reactive gas source; a particle filter which is mounted on the fifth gas circulation line to remove particles contained in the contaminated non-reactive gas which is transferred along the fifth gas circulation line after the non-reactive gas passing the fourth gas circulation line is cooled by the gas cooling unit; a third gas circulation pump which is mounted on the fifth gas circulation line to feed the non-reactive gas, which is cooled by the gas cooling unit, to the non-reactive gas source; a radiation dosimeter which is installed outside the second gas circulation line between the canister and the branched valve member to measure a radiation dose rate of the non-reactive gas which is discharged from the canister and is transferred along the second gas circulation line, and to send a measured signal to the controller; and a controller which is electrically connected to the first to third gas circulation pumps, the branched valve member, the dew point temperature measuring member, and the radiation dosimeter, respectively, to determine whether or not the non-reactive gas discharged from the canister is contaminated, according to the measured radiation dose rate received from the radiation dosimeter, and to control an operating state of the branched valve member and the first to third gas circulation pumps according to the determination result, in which the cavity of the canister is dried by circulating the non-reactive gas through the first to third gas circulation lines or the first, second, fourth and fifth gas circulation lines which are connected to the canister, the gas cooling unit and the non-reactive gas source, a radiation shielding geometry which is configured to house the radiation dosimeter of the drying apparatus to accurately measure the radiation dose rate of a target object, without being influenced by peripheral environment of the radiation dosimeter, the radiation shielding geometry comprising: a body which is a block having a radiation dosimeter assembling hole which penetrates through front and rear surfaces, and is provided with symmetrical assembling grooves on top and bottom surfaces, left and right surfaces or all surfaces, respectively; a plurality of shield plate members, each being a flat plate, and having an assembling protrusion protruding from a top surface, and an assembling groove formed on a bottom surface to be recessed in parallel with the assembling protrusion, in which the assembling protrusion of the shield plate member is detachably assembled to the assembling groove of the body, so that the body is sequentially assembled to the shield plate member; and a support stand configured to support the radiation shielding geometry, and having an assembling rod at an upper end, of which the assembling rod has the same cross-sectional shape as the assembling protrusion of the shield plate member, on top and bottom surfaces thereof to be symmetrically.

Advantageous Effects

With the dry apparatus for drying the canister loaded with the spent nuclear fuel to transport and store the spent nuclear fuel, the control method thereof, and the radiation shielding geometry for the radiation dosimeter, the dry apparatus includes the non-contaminated non-reactive gas circulation system and the contaminated non-reactive gas circulation system which are separate from each other. After the radiation dose rate is measured at the initial dry process, in case of the canister loaded with the normal spent nuclear fuel, the dry process is carried out by the non-contaminated non-reactive gas circulation system, while in case of the canister loaded with the damaged spent nuclear fuel or the spent nuclear fuel damaged in the dry process, the dry process is carried out by the contaminated non-reactive gas circulation system, thereby preventing the dry apparatus from being contaminated by the damaged spent nuclear fuel or the spent nuclear fuel damaged in the dry process. In addition, the radiation dosimeter can be installed by easily adjusting the suitable shield thickness according to the level of surrounding radiation dose rate. Moreover, since the radiation shielding geometry includes the support stand capable of self-supporting the radiation shielding geometry, it does not put stress caused by the excessive load on the target pipe, thereby improving the durability of the facility. Therefore, the radiation shielding geometry can accurately measure the radiation dose rate of the target pipe by the pipe shielding block, thereby obtaining the more accurate measurement value.

BEST MODE FOR INVENTION

Hereinafter, an embodiment of the present invention is explained in detail in conjunction with the accompanying drawings so that those skilled in the art can easily carry out the present invention. The embodiments of the present invention are intended to be illustrative only. Numerous alternative embodiments may be devised by those skilled in the art without departing from the scope of the following claims.

In the following description, detailed descriptions well-known functions or constructions will be omitted since they would obscure the invention in unnecessary detail. The terminology used herein for the purpose of describing particular embodiments only and is not intended to limit the right scope of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning.

Hereinafter, preferred embodiments of a drying apparatus for drying a canister configured to transport and store spent nuclear fuels and a control method thereof according to the present invention will be described in detail.

Figure 1:
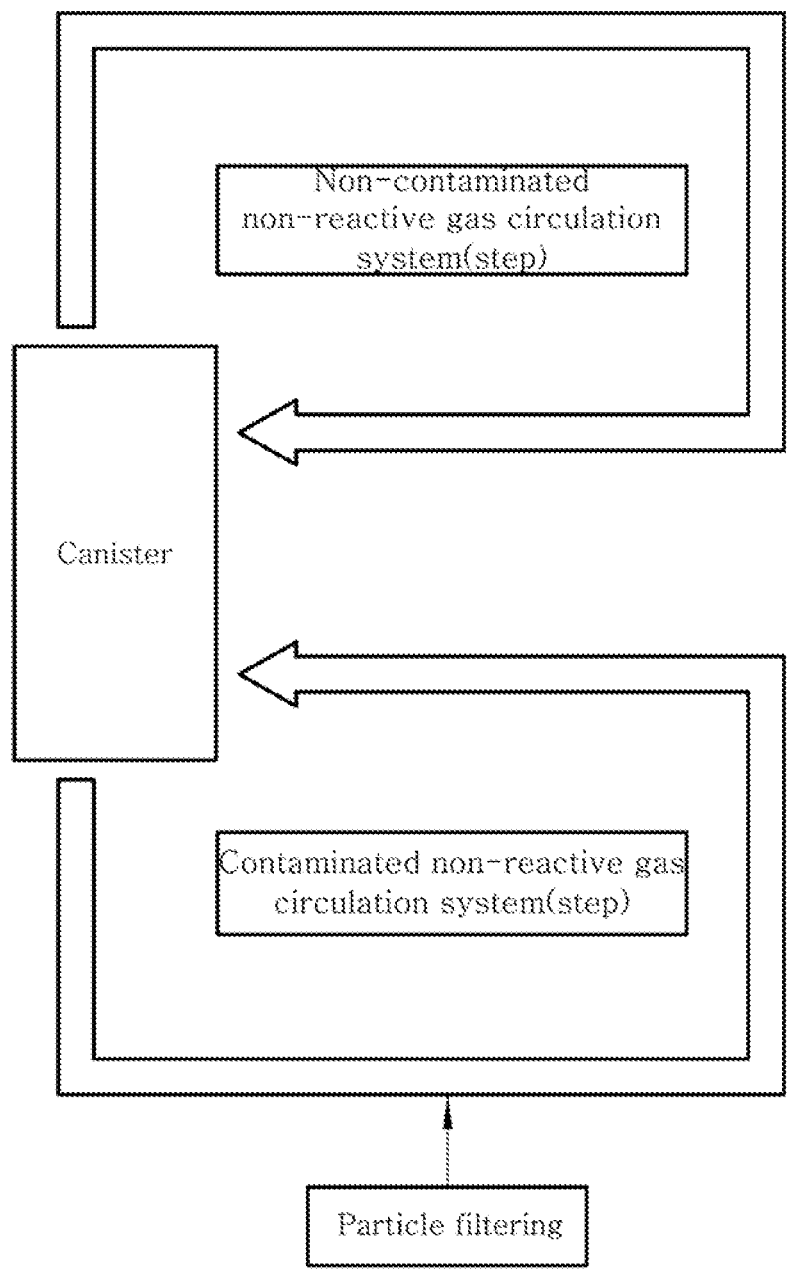
FIG. 1 is a view illustrating a process of drying a contaminated canister and a non-contaminated canister by selectively operating a non-contaminated non-reactive gas circulation system and a contaminated non-reactive gas circulation system according to a drying manner of a drying apparatus for drying the canister configured to transport and store spent nuclear fuels.

Referring to FIG. 1, the drying apparatus for drying the canister configured to transport and store the spent nuclear fuels according to the present invention employs a drying method comprising a non-reactive gas circulating step of circulating a non-reactive gas through a cavity of the canister, a dew point temperature measuring step of repetitively measuring a dew point temperature of the non-reactive gas exiting the cavity of the canister, and upon the dew point temperature of the non-reactive gas existing the cavity being measured to be at or below a predetermined dew point temperature for a determined time, a canister sealing step of discontinuing the flow of the non-reactive gas and sealing the canister, wherein the drying method further comprises a radiation dose rate measuring step.

The radiation dose rate measuring step is a step of measuring a radiation dose rate of a pipe at the initial non-reactive gas circulating step, in which the non-reactive gas passed the cavity of the canister flows through the pipe.

The non-reactive gas circulating step includes a contaminated non-reactive gas circulation step and a non-contaminated non-reactive gas circulation step.

At the contaminated non-reactive gas circulation step, when the measured value measured of radiation dose rate is above a predetermined value at the radiation dose rate measuring step, the contaminated non-reactive gas circulation system is opened so that the contaminated non-reactive gas circulates through the opened contaminated non-reactive gas circulation system.

Also, the contaminated non-reactive gas circulation step includes a particle filtering step.

The particle filtering step is a step of removing particles contained in the non-reactive gas circulating through the contaminated non-reactive gas circulation system. Specifically, the contaminated non-reactive gas circulating through the contaminated non-reactive gas circulation system is filtered by a particle filter in order to remove the particles contained in the contaminated non-reactive gas.

At the contaminated non-reactive gas circulation step, when the measured value measured of radiation dose rate is less than the predetermined value at the radiation dose rate measuring step, the non-contaminated non-reactive gas circulation system is opened so that the non-contaminated non-reactive gas circulates through the opened non-contaminated non-reactive gas circulation system.

Figure 2:
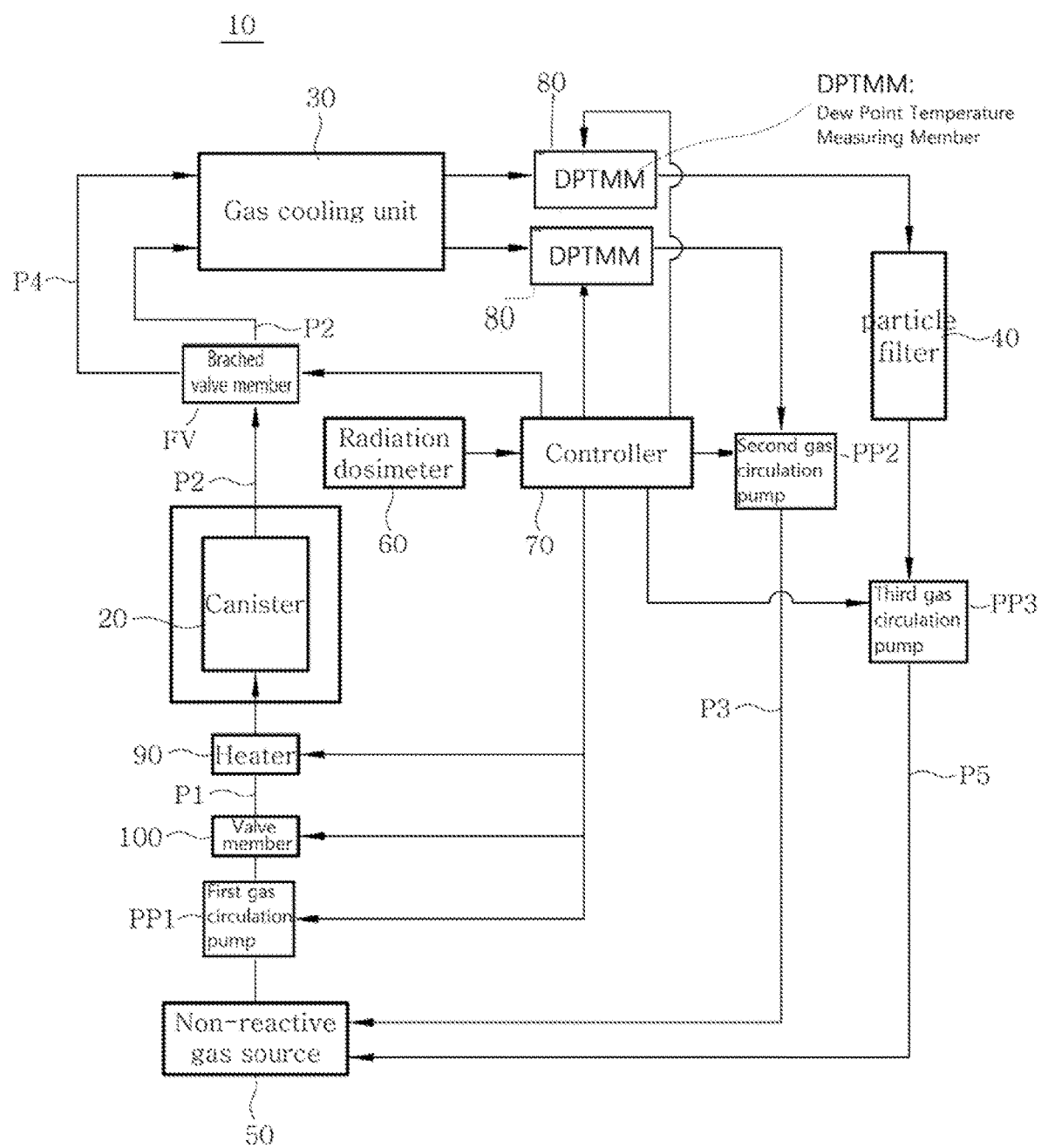
FIG. 2 is a block illustrating the configuration of the drying apparatus for drying the canister configured to transport and store the spent nuclear fuels according to the present invention, and a relationship between components of the drying apparatus.

Referring to FIG. 2, a drying apparatus 10 for carrying out the method for drying the canister configured to transport and store the spent nuclear fuels according to the present invention is to dry a cavity of a canister 20 loaded with spent nuclear fuels, and includes a fourth gas circulation line P4, a branched valve member FV, a fifth gas circulation line P5, a particle filter 40, a third gas circulation pump PP3, and a radiation dosimeter 60.

The drying apparatus of the related art generally includes the canister 20, a non-reactive gas source 50, a first gas circulation pump PP1, a gas cooling unit 30, a dew point temperature measuring member 80, a second gas circulation pump PP2, a valve member 100, a heater 90 and a controller 70. The drying apparatus circulates the non-reactive gas along first to third gas circulation lines P1, P2 and P3 connected to the canister 20 through the canister 20, the gas cooling unit 30 and the non-reactive gas source 50, thereby drying the cavity of the canister 20.

The canister 20 has the cavity loaded with the spent nuclear fuels, and is provided with a gas inlet port and a gas outlet port which communicate with the cavity.

The non-reactive gas source 50 stores the non-reactive gas supplied to the cavity of the canister 20.

The first gas circulation pump PP1 is mounted on the first gas circulation line P1 which connects the canister 20 and the non-reactive gas source 50 to communicate with each other, to feed the non-reactive gas supplied from the non-reactive gas source 50 to the canister 20.

The valve member 100 is mounted on the first gas circulation line PP1 between the first gas circulation pump PP1 and the canister 20 to open or close the first gas circulation line PP1.

The heater 90 is mounted on the first gas circulation line P1 between the valve member 100 and the canister 20 to heat the non-reactive gas to be supplied to the canister 20.

The gas cooling unit 30 is fluidly coupled to the canister 20 through the second gas circulation line P2 to cool the non-reactive gas discharged from the cavity of the canister 20.

The dew point temperature measuring member 80 is mounted on the third gas circulation line P3 which connects the gas cooling unit 30 and the non-reactive gas source 50 to communicate each other, to repeatedly measure the dew point temperature of the non-reactive gas.

The second gas circulation pump PP2 is mounted on the third gas circulation line P3 to feed the non-reactive gas, which passes through the gas cooling unit 30, to the non-reactive gas source 50.

The controller 70 is electrically connected to the first and second gas circulation pumps PP1 and PP2 and the dew point temperature measuring member 80 to control operating states of the first and second gas circulation pumps PP1 and PP2 and the dew point temperature measuring member 80.

The drying apparatus 10 for carrying out the method for drying the canister configured to transport and store the spent nuclear fuels according to the present invention further includes the fourth gas circulation line P4, the branched valve member FV, the fifth gas circulation line P5, the particle filter 40, the third gas circulation pump PP3, and the radiation dosimeter 60, in addition to the above-described components of the drying apparatus according to the related art.

The fourth gas circulation line P4 is branched from the second gas P2, to fluidly connect the gas cooling unit 30 and the canister 20, separately from the second gas circulation line P2, so as to transfer the contaminated non-reactive gas, which is discharged from the canister 20, to the gas cooling unit 30.

The branched valve member FV is an electronic valve electrically connected to the controller 70, and is mounted on a branched point FP, from which the second and fourth gas circulation lines P2 and P4 are branched, so that the branched valve member is controlled by the controller 70 to selectively open or close the second or fourth gas circulation line P2 or P4.

The fifth gas circulation line P5 is fluidly coupled to the fourth gas circulation line P4 to fluidly connect the gas cooling unit 30 and the non-reactive gas source.

The particle filter 40 is mounted on the fifth gas circulation line P5 to remove particles contained in the contaminated non-reactive gas which is transferred along the fifth gas circulation line P5 after the non-reactive gas passing the fourth gas circulation line P4 is cooled by the gas cooling unit 30.

The third gas circulation pump PP3 is mounted on the fifth gas circulation line P5 to feed the non-reactive gas, which is cooled by the gas cooling unit 30, to the non-reactive gas source 50.

The radiation dosimeter 60 is installed outside the second gas circulation line P2 between the canister 20 and the branched valve member FV to measure the radiation dose rate of the non-reactive gas which is discharged from the canister 20 and is transferred along the second gas circulation line P2, and to send a measured signal to the controller 70. The controller 70 controls the operation of the branched valve member FV and the first to third gas circulation pumps PP1 to PP3 according to the measured signal received from the radiation dosimeter.

The controller 70 is electrically connected to the radiation dosimeter 60, the branched valve member FV, the dew point temperature measuring member 80, and the third gas circulation pump PP3, respectively, to determine whether or not the non-reactive gas discharged from the canister 20 is contaminated, according to the measured radiation dose rate received from the radiation dosimeter 60. More specifically, the controller 70 controls the branched valve member FV as follows: if it is determined that the non-reactive gas is contaminated, the controller closes the second gas circulation line P2, and opens the fourth gas circulation line P4, so that the contaminated non-reactive gas discharged from the canister circulates along the fourth, fifth and first gas circulation lines P4, P5 and P1; and if it is determined that the non-reactive gas is not contaminated, the controller closes the fourth gas circulation line P4, and opens the second gas circulation line P2, so that the non-contaminated non-reactive gas discharged from the canister 20 circulates along the second, third and first gas circulation lines P2, P3 and P1.

Figure 3:
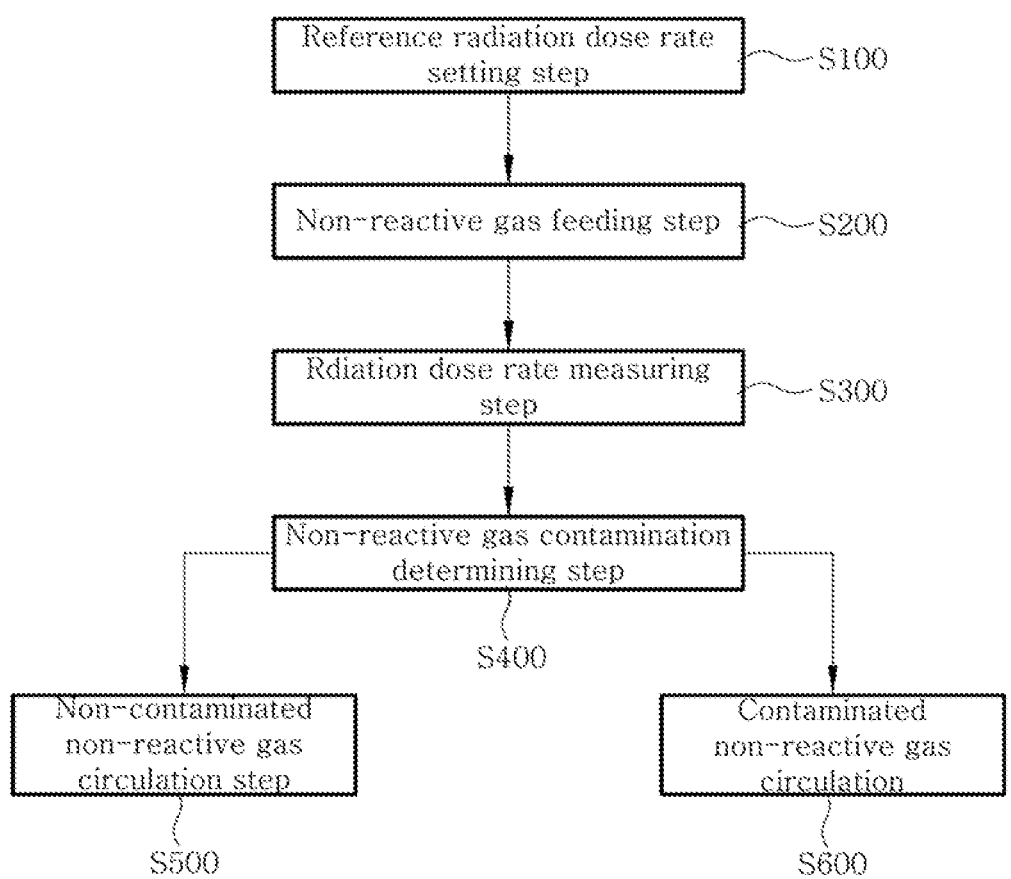
FIG. 3 is a schematic view illustrating a method for controlling the drying apparatus for drying the canister configured to transport and store the spent nuclear fuels according to the present invention.

Referring to FIG. 3, the method for controlling the drying apparatus for drying the canister configured to transport and store the spent nuclear fuels according to the present invention includes a reference radiation dose rate setting step S100, a non-reactive gas feeding step S200, a radiation dose rate measuring step S300, a non-reactive gas contamination determining step S400, a non-contaminated non-reactive gas circulation step S500, and a contaminated non-reactive gas circulation step S600.

The reference radiation dose rate setting step S100 is a step of setting a reference radiation dose rate to determine whether the non-reactive gas is contaminated or not.

The non-reactive gas feeding step S200 is a step of feeding the non-reactive gas to the cavity of the canister 20 through the first gas circulation line P1.

The radiation dose rate measuring step S300 is a step of measuring the radiation dose rate of the non-reactive gas transferred along the second gas circulation line P2 at the non-reactive gas outlet port of the canister 20.

The non-reactive gas contamination determining step S400 is a step of determining whether the non-reactive gas is contaminated or not, on the basis of that the radiation dose rate of the non-reactive gas measured at the radiation dose rate measuring step S300 reaches the predetermined reference value.

If it is determined at the non-reactive gas contamination determining step S400 that the non-reactive gas is not contaminated, the non-contaminated non-reactive gas circulation step S500 is a step of opening the non-contaminated non-reactive gas circulation system, and closing the contaminated non-reactive gas circulation system, so that the non-contaminated non-reactive gas circulates along the non-contaminated non-reactive gas circulation system. The non-contaminated non-reactive gas circulation system is a circulation line including the first to third gas circulation lines P1, P2 and P3.

If it is determined at the non-reactive gas contamination determining step S400 that the non-reactive gas is contaminated, the contaminated non-reactive gas circulation step S600 is a step of opening the contaminated non-reactive gas circulation system, and closing the non-contaminated non-reactive gas circulation system, so that the contaminated non-reactive gas circulates along the contaminated non-reactive gas circulation system. The contaminated non-reactive gas circulation system is a circulation line including the first, second, fourth and fifth gas circulation lines P1, P2, P4 and P5.

With the above-described configuration of the drying apparatus for drying the canister configured to transport and store the spent nuclear fuels according to the present invention and the control method thereof, in addition to the drying apparatus of the related art, it is determined that the non-reactive gas discharged from the canister 20 is contaminated or not, and if the non-reactive gas is contaminated, the branched valve member is controlled so that the non-reactive gas circulates through the contaminated non-reactive gas circulation system, while if the non-reactive gas is not contaminated, the branched valve member is controlled so that the non-reactive gas circulates through the non-contaminated non-reactive gas circulation system, thereby drying the cavity of the canister. Therefore, it is possible to prevent the drying apparatus from being contaminated by radioactive substances contained in the non-reactive gas, and thus to prevent the canister, which is not contaminated, by the radioactive substances.

Figure 4:
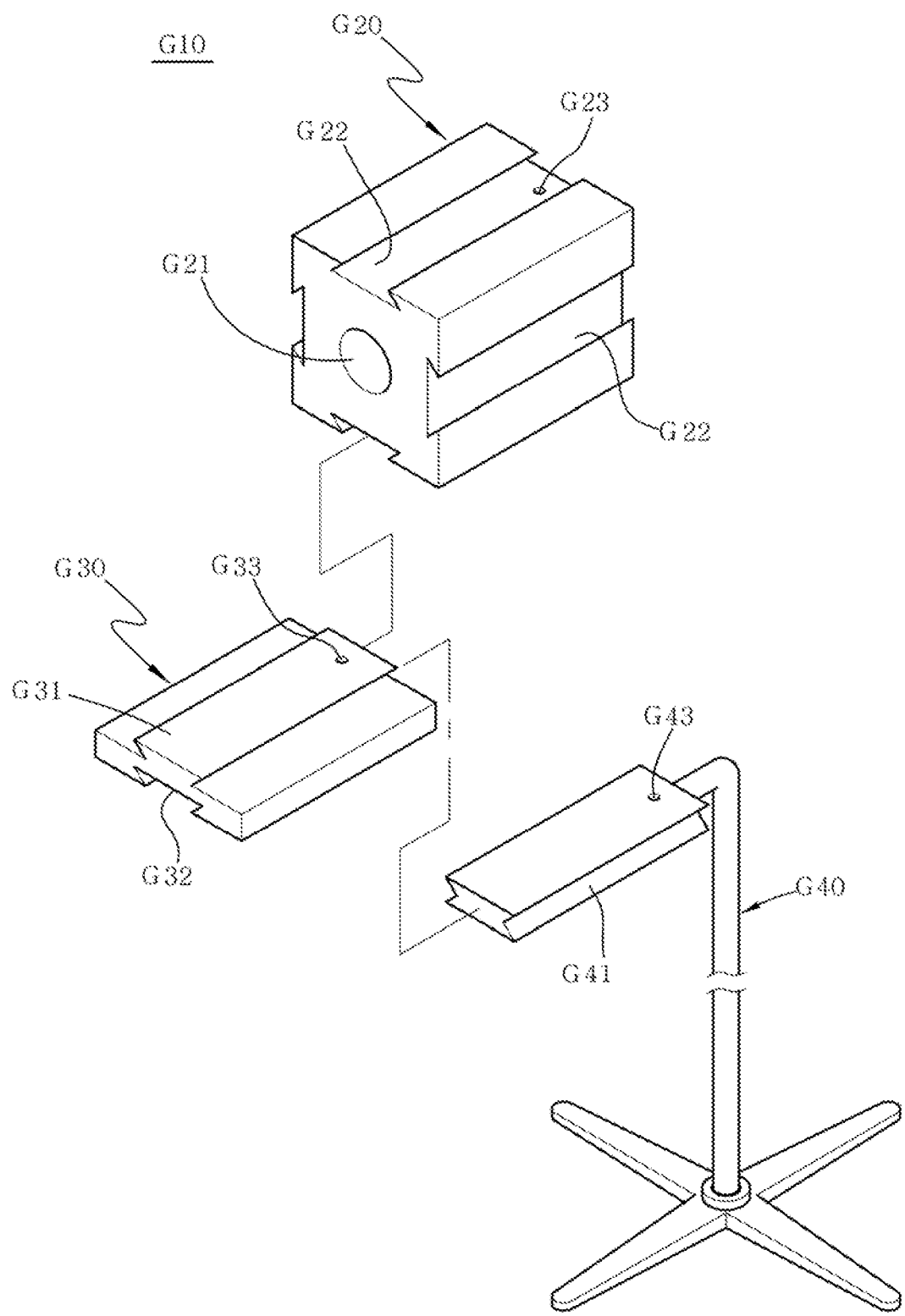
FIG. 4 is an exploded perspective view illustrating a radiation shielding geometry for a radiation dosimeter configured to measure a radiation dose rate of the drying apparatus for drying the canister configured to transport and store the spent nuclear fuels according to the present invention.
Figure 5:
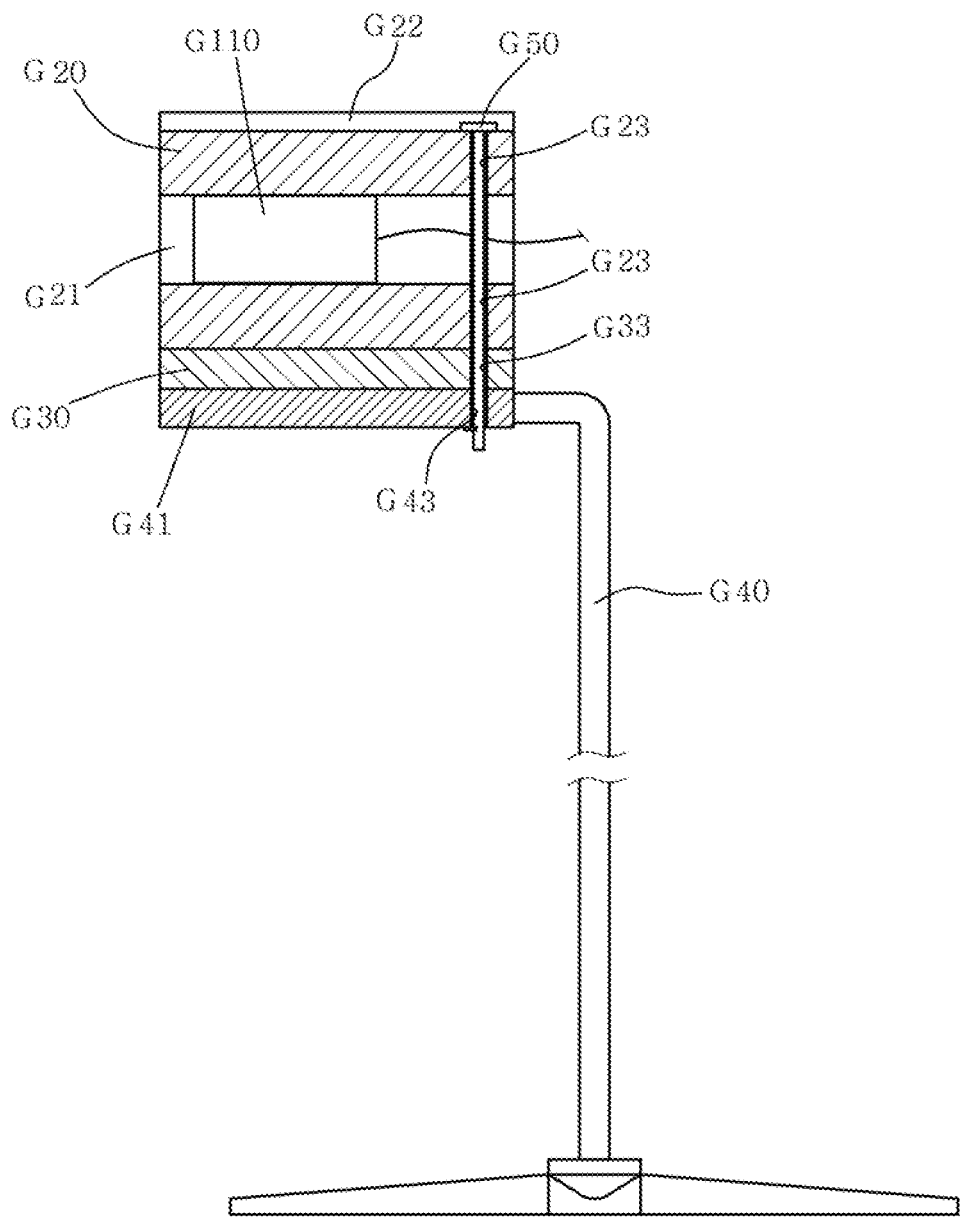
FIG. 5 is a cross-sectional view illustrating an assembled state of the radiation shielding geometry in FIG. 4.

Referring to FIGS. 4 and 5, a radiation shielding geometry G10 for the radiation dosimeter, configured to measure the radiation dose rate, of the drying apparatus for drying the canister configured to transport and store the spent nuclear fuels according to the present invention includes a body G20, a plurality of shield plate members G30 and a support stand G40.

The body G20 is a block having a radiation dosimeter assembling hole G21 which penetrates through front and rear surfaces, and is provided with symmetrical assembling grooves G22 on top and bottom surfaces, left and right surfaces or all surfaces, respectively.

Each of the shield plate members G30 is a flat plate, and has an assembling protrusion G31 protruding from a top surface, and an assembling groove G31 formed on a bottom surface to be recessed in parallel with the assembling protrusion G31. The assembling protrusion G31 of the shield plate member G30 is detachably assembled to the assembling groove G22 of the body G20, so that the body is sequentially assembled to the shield plate member.

The support stand G40 is to support the radiation shielding geometry G10, and has an assembling rod G41 at an upper end, of which the assembling rod has the same cross-sectional shape as the assembling protrusion G31 of the shield plate member G30, on top and bottom surfaces thereof to be symmetrically. Specifically, the assembling rod G41 has a dovetail cross section which is symmetrical with respect to an axis in a vertical direction.

The assembling groove G22 of the body G20 and the assembling groove G32 of the shield plate member G30 are dovetail grooves, and the assembling protrusion G31 of the shield plate member G30 and the assembling rod G41 are dovetail protrusions.

The body G20, the shield plate member G30 and the assembling rod G41 of the support stand G40 have through-holes G23, G33 and G43 which coaxially penetrate the components, and a fixing pin G50 is fitted into the respective through-holes G23, G33 and G43 to maintain an assembled state thereof.

With the configuration of the radiation shielding geometry G10 for the radiation dosimeter, configured to measure the radiation dose rate, of the drying apparatus for drying the canister configured to transport and store the spent nuclear fuels according to the present invention, the radiation dosimeter G110 can be easily and quickly installed as follows: a position, at which the radiation dosimeter G110 will be installed, is selected; a radiation dose rate radiated from peripheral facilities is measured on the basis of the selected position; a thickness suitable for surrounding radiation dose rate is computed; the needed number of the shield plate members G30 is assembled to the outer surface of the body G20 according to the computed thickness; the fixing pin G50 is coaxially fitted into the through-holes G23, G33 and G43 to fix the assembled state; the assembly is installed to the assembling rod G41 of the support stand G40; and after the height of the support stand G40 is adjusted, the support stand G40 is disposed at the selected position.

MODE FOR INVENTION

Figure 6:
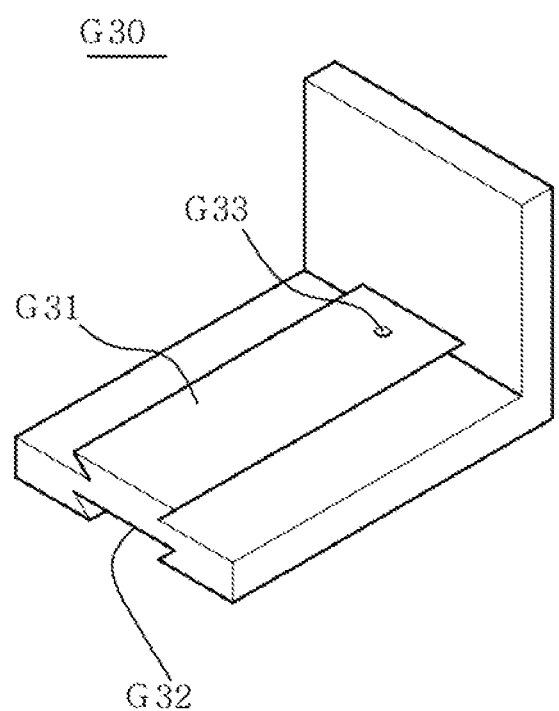
FIG. 6 is a perspective view illustrating another embodiment of a shield plate which is provided in the radiation shielding geometry for the radiation dosimeter configured to measure the radiation dose rate of the drying apparatus for drying the canister configured to transport and store the spent nuclear fuels according to the present invention.
Figure 7:
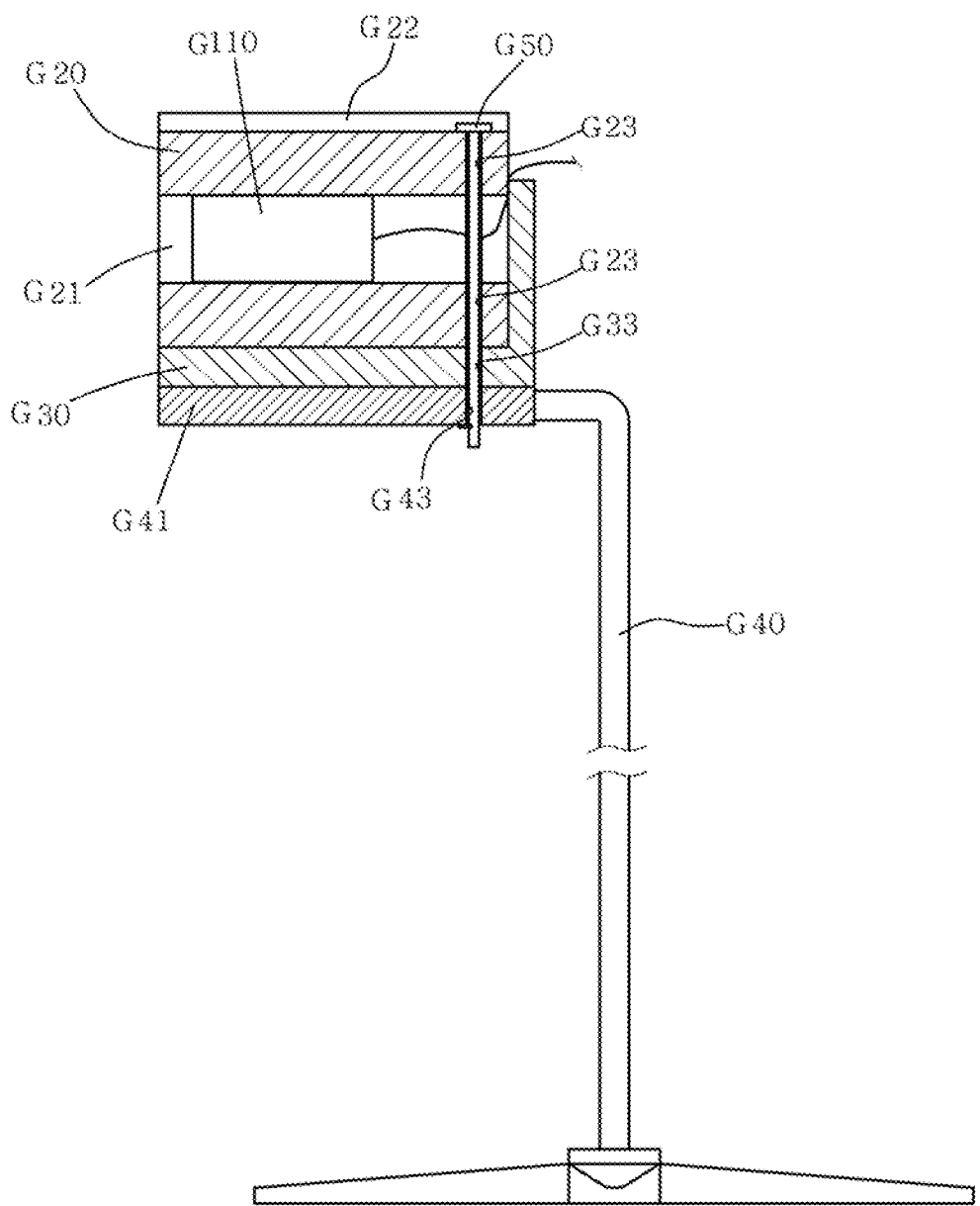
FIG. 7 is a cross-sectional view illustrating an assembled state of the radiation shielding geometry provided with the shield plate in FIG. 6.

Referring to FIGS. 6 and 7, a shield plate member G30 according to another embodiment is an L-shaped bent plate, and has an assembling protrusion G31 protruding from a top surface, and an assembling groove G31 formed on a bottom surface to be recessed in parallel with the assembling protrusion G31.

Figure 8:
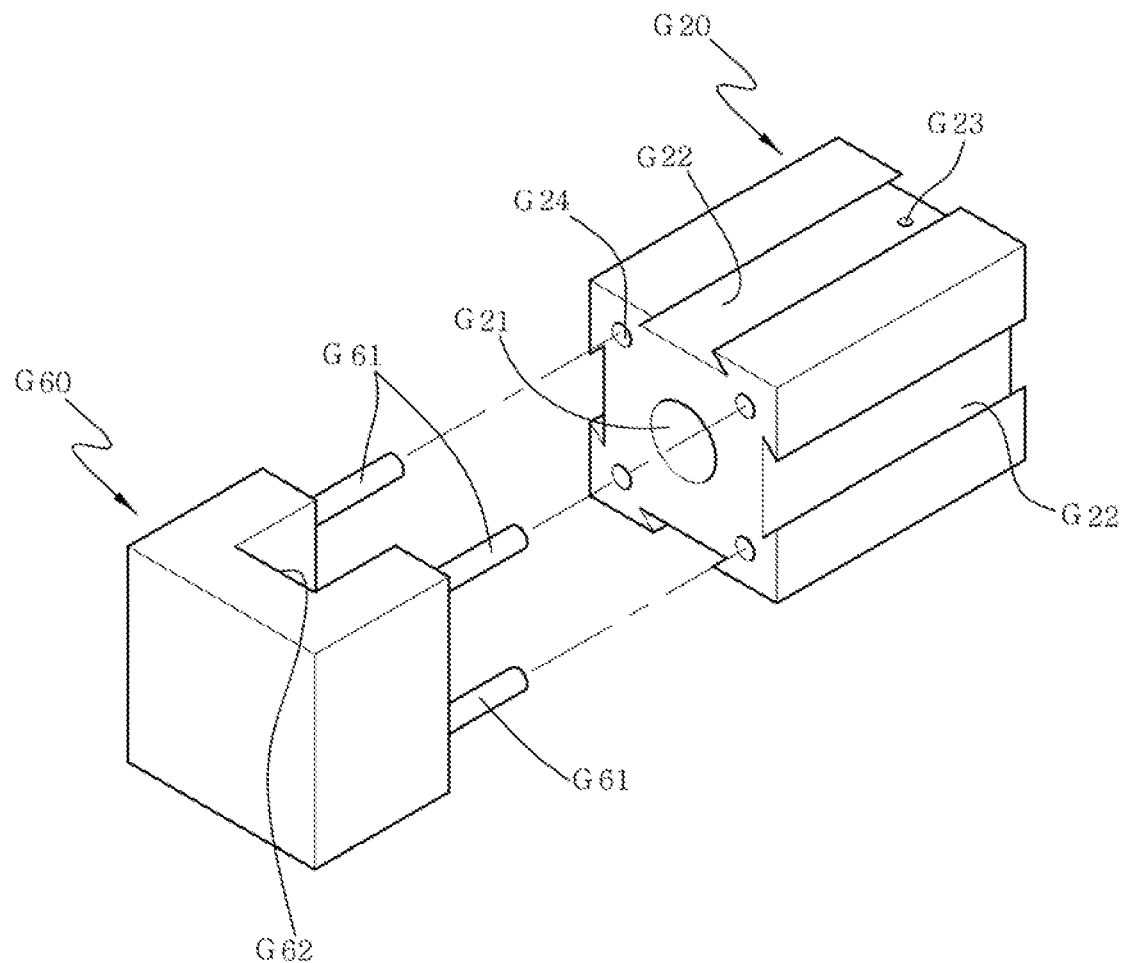
FIG. 8 is an exploded perspective view illustrating a pipe shielding block which is provided in the radiation shielding geometry for the radiation dosimeter configured to measure the radiation dose rate of the drying apparatus for drying the canister configured to transport and store the spent nuclear fuels according to the present invention.
Figure 9:
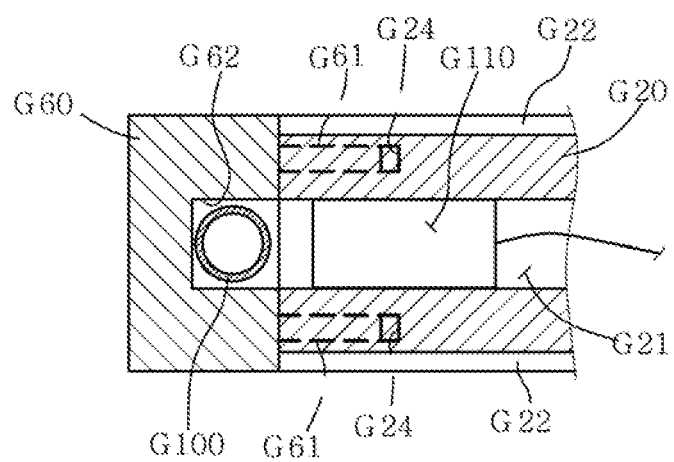
FIG. 9 is a cross-sectional view illustrating the pipe shielding block in FIG. 8 which is assembled with a body.

Referring to FIGS. 8 and 9, the radiation shielding geometry G10 for the radiation dosimeter, configured to measure the radiation dose rate, of the drying apparatus for drying the canister configured to transport and store the spent nuclear fuels according to the present invention further includes a plurality of assembling holes G24 formed on both end faces of the body G20, and a pipe shield block G60.

The plurality of assembling holes G24 are formed at each corner of both end faces of the body G20.

The pipe shield block G60 is a rectangular block, and has a plurality of assembling pins G61 protruding from each corner of the end face in parallel with each other and detachably fitted into the assembling holes G24, and a pipe receiving groove G62 which is recessed on the end face having the assembling pins G61, so that the target pipe G100 is detachably assembled to the body G20 in a state in which the pipe is received in the pipe receiving groove G62.

The pipe shield block G60 shields radiation emitted from peripheral radiation sources which are positioned at a rear side (opposite to the end face of the body G20 built with the radiation dosimeter G110) of a target pipe G100. Specifically, by interposing the pipe G100 between the body G20 and the pipe shield block G60, it is possible to completely shield the radiation at the rear side of the target pipe G100 which exerts a bad influence on the measured value of the radiation dose rate.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the inventive as defined by the appended claims and equivalents thereof.

INDUSTRIAL APPLICABILITY

When starting the drying process of storing the spent nuclear fuels in a dry state, which are high-level wastes produced from a nuclear power plant, in the canister configured to store and transport the spent nuclear fuels for long periods of time, after it is determined whether the spent nuclear fuels loaded in the canister are damaged or not, based on the measured value of the radiation dose rate of the non-reactive gas initially discharged from the cavity of the canister, the non-reactive gas discharged from the canister is circulated through any one of the contaminated non-reactive gas circulation system and the non-contaminated non-reactive gas circulation system to dry the cavity of the canister, thereby preventing the drying apparatus from being contaminated by the radioactive substance contained in the damaged spent nuclear fuels. In addition, the measurement result is not affected from the radiation emitted from peripheral radiation sources. Also, the radiation dosimeter can be installed by easily adjusting a suitable shield thickness according to the level of surrounding radiation dose rate, while detecting the radiation dose rate of the target pipe. Moreover, since the radiation shielding geometry includes the support stand, it does not put stress caused by the excessive load on the target pipe. Therefore, the present invention can safely and quickly construct the canister drying system capable of carrying out the process of drying the canister to store and transport the spend nuclear fuels.

The invention claimed is:

1. A drying apparatus for drying a cavity of a canister loaded with a spent nuclear fuel, the drying apparatus comprising:
   the canister having the cavity provided with a gas inlet port and a gas outlet port;
   a non-reactive gas source configured to store a non-reactive gas to be supplied to the cavity of the canister;
   a first gas circulation pump which is mounted on a first gas circulation line which connects the canister and the non-reactive gas source to communicate with each other, to feed the non-reactive gas supplied from the non-reactive gas source to the canister;
   a valve member which is mounted on the first gas circulation line between the first gas circulation pump and the canister to open or close the first gas circulation line;
   a heater which is mounted on the first gas circulation line between the valve member and the canister to heat the non-reactive gas to be supplied to the canister;
   a gas cooling unit which is fluidly coupled to the canister through a second gas circulation line to cool the non-reactive gas discharged from the cavity of the canister;
   a dew point temperature measuring member which is mounted on a third gas circulation line, which connects the gas cooling unit and the reactive gas source to communicate each other, to repeatedly measure a dew point temperature of the non-reactive gas;
   a second gas circulation pump which is mounted on the third gas circulation line to feed the non-reactive gas, which passes through the gas cooling unit, to the non-reactive gas source;
   a controller which is electrically connected to the first and second gas circulation pumps and the dew point temperature measuring member to control an operating state of the first and second gas circulation pumps and the dew point temperature measuring member;
   a fourth gas circulation line which is branched from the second gas, to fluidly connect the gas cooling unit and the canister, separately from the second gas circulation line, so as to transfer a contaminated non-reactive gas, which is discharged from the canister, to the gas cooling unit;
   a branched valve member which is mounted on a branched point, from which the second and fourth gas circulation lines are branched, to selectively open or close the second or fourth gas circulation line;
   a fifth gas circulation line which is fluidly coupled to the fourth gas circulation line to fluidly connect the gas cooling unit and the non-reactive gas source;
   a particle filter which is mounted on the fifth gas circulation line to remove particles contained in the contaminated non-reactive gas which is transferred along the fifth gas circulation line after the non-reactive gas passing the fourth gas circulation line is cooled by the gas cooling unit;
   a third gas circulation pump which is mounted on the fifth gas circulation line to feed the non-reactive gas, which is cooled by the gas cooling unit, to the non-reactive gas source; and
   a radiation dosimeter which is installed outside the second gas circulation line between the canister and the branched valve member to measure a radiation dose rate of the non-reactive gas which is discharged from the canister and is transferred along the second gas circulation line, and to send a measured signal to the controller, wherein
   the controller is electrically connected to the radiation dosimeter, the branched valve member, the dew point temperature measuring member, and the third gas circulation pump, respectively, to determine whether or not the non-reactive gas discharged from the canister is contaminated, according to the measured radiation dose rate received from the radiation dosimeter; if it is determined that the non-reactive gas is contaminated, the controller closes the second gas circulation line, and opens the fourth gas circulation line, so that the contaminated non-reactive gas discharged from the canister circulates along the fourth, fifth and first gas circulation lines; and if it is determined that the non-reactive gas is not contaminated, the controller closes the fourth gas circulation line, and opens the second gas circulation line, so that the non-contaminated non-reactive gas discharged from the canister circulates along the second, third and first gas circulation lines.

2. The drying apparatus for drying the canister loaded with the spent nuclear fuel according to claim 1, wherein the branched valve member is an electronic valve, and
   the radiation dosimeter is electrically connected to the controller to send the signal to the controller, so that the controller controls the operation of the branched valve member and the first to third gas circulation pumps according to the received signal.

3. In a drying apparatus for drying a cavity of a canister loaded with a spent nuclear fuel, the drying apparatus including
   the canister having the cavity provided with a gas inlet port and a gas outlet port;

a non-reactive gas source configured to store a non-reactive gas to be supplied to the cavity of the canister;

a first gas circulation pump which is mounted on a first gas circulation line which connects the canister and the non-reactive gas source to communicate with each other, to feed the non-reactive gas supplied from the non-reactive gas source to the canister;

a valve member which is mounted on the first gas circulation line between the first gas circulation pump and the canister to open or close the first gas circulation line;

a heater which is mounted on the first gas circulation line between the valve member and the canister to heat the non-reactive gas to be supplied to the canister;

a gas cooling unit which is fluidly coupled to the canister through a second gas circulation line to cool the non-reactive gas discharged from the cavity of the canister;

a dew point temperature measuring member which is mounted on a third gas circulation line, which connects the gas cooling unit and the reactive gas source to communicate each other, to repeatedly measure a dew point temperature of the non-reactive gas;

a second gas circulation pump which is mounted on the third gas circulation line to feed the non-reactive gas, which passes through the gas cooling unit, to the non-reactive gas source;

a fourth gas circulation line which is branched from the second gas, to fluidly connect the gas cooling unit and the canister, separately from the second gas circulation line, so as to transfer a contaminated non-reactive gas, which is discharged from the canister, to the gas cooling unit;

a branched valve member which is mounted on a branched point, from which the second and fourth gas circulation lines are branched, to selectively open or close the second or fourth gas circulation line;

a fifth gas circulation line which is fluidly coupled to the fourth gas circulation line to fluidly connect the gas cooling unit and the non-reactive gas source;

a particle filter which is mounted on the fifth gas circulation line to remove particles contained in the contaminated non-reactive gas which is transferred along the fifth gas circulation line after the non-reactive gas passing the fourth gas circulation line is cooled by the gas cooling unit;

a third gas circulation pump which is mounted on the fifth gas circulation line to feed the non-reactive gas, which is cooled by the gas cooling unit, to the non-reactive gas source;

a radiation dosimeter which is installed outside the second gas circulation line between the canister and the branched valve member to measure a radiation dose rate of the non-reactive gas which is discharged from the canister and is transferred along the second gas circulation line, and to send a measured signal to the controller; and a controller which is electrically connected to the first to third gas circulation pumps, the branched valve member, the dew point temperature measuring member, and the radiation dosimeter, respectively, to determine whether or not the non-reactive gas discharged from the canister is contaminated, according to the measured radiation dose rate received from the radiation dosimeter, and to control an operating state of the branched valve member and the first to third gas circulation pumps according to the determination result, a method for controlling the drying apparatus which dries the cavity of the canister by circulating the non-reactive gas discharged from the canister along a non-contaminated non-reactive gas circulation system or a contaminated non-reactive gas circulation system according to the contaminated or non-contaminated state of the non-reactive gas, the control method comprising:

a reference radiation dose rate setting step of setting a reference radiation dose rate to determine whether the non-reactive gas is contaminated or not;

a non-reactive gas feeding step of feeding the non-reactive gas to the cavity of the canister through the first gas circulation line;

a radiation dose rate measuring step of measuring the radiation dose rate of the non-reactive gas transferred along the second gas circulation line at the non-reactive gas outlet port of the canister;

a non-reactive gas contamination determining step of determining whether the non-reactive gas is contaminated or not, on the basis of that the radiation dose rate of the non-reactive gas measured at the radiation dose rate measuring step reaches the predetermined reference value;

if it is determined at the non-reactive gas contamination determining step that the non-reactive gas is not contaminated, a non-contaminated non-reactive gas circulation step of opening the non-contaminated non-reactive gas circulation system, and closing the contaminated non-reactive gas circulation system, so that the non-contaminated non-reactive gas circulates along the non-contaminated non-reactive gas circulation system;

if it is determined at the non-reactive gas contamination determining step that the non-reactive gas is contaminated, a contaminated non-reactive gas circulation step of opening the contaminated non-reactive gas circulation system, and closing the non-contaminated non-reactive gas circulation system, so that the contaminated non-reactive gas circulates along the contaminated non-reactive gas circulation system.

4. The method for controlling the drying apparatus of drying the cavity of the canister loaded with the spent nuclear fuel according to claim 3, wherein the non-contaminated non-reactive gas circulation system is a circulation line including the first to third gas circulation lines, and the contaminated non-reactive gas circulation system is a circulation line including the first, second, fourth and fifth gas circulation lines.

5. In a drying apparatus for drying a cavity of a canister loaded with a spent nuclear fuel, the drying apparatus including the canister having the cavity provided with a gas inlet port and a gas outlet port;

a non-reactive gas source configured to store a non-reactive gas to be supplied to the cavity of the canister;

a first gas circulation pump which is mounted on a first gas circulation line which connects the canister and the non-reactive gas source to communicate with each other, to feed the non-reactive gas supplied from the non-reactive gas source to the canister;

a valve member which is mounted on the first gas circulation line between the first gas circulation pump and the canister to open or close the first gas circulation line;

a heater which is mounted on the first gas circulation line between the valve member and the canister to heat the non-reactive gas to be supplied to the canister;

a gas cooling unit which is fluidly coupled to the canister through a second gas circulation line to cool the non-reactive gas discharged from the cavity of the canister;

a dew point temperature measuring member which is mounted on a third gas circulation line, which connects the gas cooling unit and the reactive gas source to communicate each other, to repeatedly measure a dew point temperature of the non-reactive gas;

a second gas circulation pump which is mounted on the third gas circulation line to feed the non-reactive gas, which passes through the gas cooling unit, to the non-reactive gas source;

a fourth gas circulation line which is branched from the second gas, to fluidly connect the gas cooling unit and the canister, separately from the second gas circulation line, so as to transfer a contaminated non-reactive gas, which is discharged from the canister, to the gas cooling unit;

a branched valve member which is mounted on a branched point, from which the second and fourth gas circulation lines are branched, to selectively open or close the second or fourth gas circulation line;

a fifth gas circulation line which is fluidly coupled to the fourth gas circulation line to fluidly connect the gas cooling unit and the non-reactive gas source;

a particle filter which is mounted on the fifth gas circulation line to remove particles contained in the contaminated non-reactive gas which is transferred along the fifth gas circulation line after the non-reactive gas passing the fourth gas circulation line is cooled by the gas cooling unit;

a third gas circulation pump which is mounted on the fifth gas circulation line to feed the non-reactive gas, which is cooled by the gas cooling unit, to the non-reactive gas source;

a radiation dosimeter which is installed outside the second gas circulation line between the canister and the branched valve member to measure a radiation dose rate of the non-reactive gas which is discharged from the canister and is transferred along the second gas circulation line, and to send a measured signal to the controller; and a controller which is electrically connected to the first to third gas circulation pumps, the branched valve member, the dew point temperature measuring member, and the radiation dosimeter, respectively, to determine whether or not the non-reactive gas discharged from the canister is contaminated, according to the measured radiation dose rate received from the radiation dosimeter, and to control an operating state of the branched valve member and the first to third gas circulation pumps according to the determination result, in which the cavity of the canister is dried by circulating the non-reactive gas through the first to third gas circulation lines or the first, second, fourth and fifth gas circulation lines which are connected to the canister, the gas cooling unit and the non-reactive gas source, a radiation shielding geometry which is configured to house the radiation dosimeter of the drying apparatus to accurately measure the radiation dose rate of a target object, without being influenced by peripheral environment of the radiation dosimeter, the radiation shielding geometry comprising:

a body which is a block having a radiation dosimeter assembling hole which penetrates through front and rear surfaces, and is provided with symmetrical assembling grooves on top and bottom surfaces, left and right surfaces or all surfaces, respectively;

a plurality of shield plate members, each being a flat plate, and having an assembling protrusion protruding from a top surface, and an assembling groove formed on a bottom surface to be recessed in parallel with the assembling protrusion, in which the assembling protrusion of the shield plate member is detachably assembled to the assembling groove of the body, so that the body is sequentially assembled to the shield plate member; and a support stand configured to support the radiation shielding geometry, and having an assembling rod at an upper end, of which the assembling rod has the same cross-sectional shape as the assembling protrusion of the shield plate member, on top and bottom surfaces thereof to be symmetrically.

6. The radiation shielding geometry for housing the radiation dosimeter of the drying apparatus according to claim 5, wherein the shield plate member is an L-shaped bent plate, and has an assembling protrusion protruding from a top surface, and an assembling groove formed on a bottom surface to be recessed in parallel with the assembling protrusion.

7. The radiation shielding geometry for housing the radiation dosimeter of the drying apparatus according to claim 5, wherein the assembling groove of the body and the assembling groove of the shield plate member are dovetail grooves, and the assembling protrusion of the shield plate member is a dovetail protrusion.

8. The radiation shielding geometry for housing the radiation dosimeter of the drying apparatus according to claim 5, wherein the body, the shield plate member and the assembling rod of the support stand have through-holes which coaxially penetrate the components, and a fixing pin is fitted into the respective through-holes of the body, the shield plate member and the assembling rod of the support stand which are assembled to each other to arrange the through-holes in a straight line, to maintain the assembled state thereof.

9. The radiation shielding geometry for housing the radiation dosimeter of the drying apparatus according to claim 5, further comprising:

a plurality of assembling holes formed on each corner of both end faces of the body; and a pipe shield block which is a rectangular block, and has a plurality of assembling pins protruding from each corner of the end face in parallel with each other and detachably fitted into the assembling holes, and a pipe receiving groove which is recessed on the end face having the assembling pins, so that the target pipe is detachably assembled to the body in a state in which the pipe is received in the pipe receiving groove.

* * * * *